US007000145B2

(12) United States Patent
Werner et al.

(10) Patent No.: US 7,000,145 B2
(45) Date of Patent: *Feb. 14, 2006

(54) METHOD, SYSTEM, AND PROGRAM FOR REVERSE RESTORE OF AN INCREMENTAL VIRTUAL COPY

(75) Inventors: Sam Clark Werner, Tucson, AZ (US); William Frank Micka, Tucson, AZ (US); Dalit Tzafrir, Haifa (IL); Matthew Sanchez, Tucson, AZ (US); Sivan Tal, Yokneam Illit (IL); Ifat Nuriel, Haifa (IL); Sheli Rahav, Haifa (IL); Gail Andrea Spear, Tucson, AZ (US); Warren K. Stanley, Tucson, AZ (US); Thomas Charles Jarvis, Tucson, AZ (US); Amiram Hayardeny, Binyamina (IL); Shachar Fienblit, Ein Ayala (IL); Rivka Mayraz Matosevich, Zichron-Ya'acov (IL); Svetlana Shukevich, Yaar Odem (IL); Theresa Mary Brown, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 302 days.

This patent is subject to a terminal disclaimer.

(21) Appl. No.: 10/464,918

(22) Filed: Jun. 18, 2003

(65) Prior Publication Data
US 2004/0260895 A1    Dec. 23, 2004

(51) Int. Cl.
*G06F 12/12*     (2006.01)
*G06F 12/16*     (2006.01)

(52) U.S. Cl. .................... 714/20; 707/203; 707/204; 707/202; 711/161; 711/162

(58) Field of Classification Search ................ 707/200, 707/201, 202, 203, 204, 205; 714/1, 2, 5, 714/6, 7, 8, 13, 20; 711/161, 162, 156, 147
See application file for complete search history.

(56) References Cited

U.S. PATENT DOCUMENTS 5,495,587 A  *  2/1996  Comfort et al. ............ 712/228

(Continued)

OTHER PUBLICATIONS

"Schedule Program Diskette File Structure". IBM Technical Disclosure Bulletin, Jan. 1, 1987, vol. 29, issue 8, pp. 3508-3511.*

(Continued)

*Primary Examiner*—B. James Peikari
(74) *Attorney, Agent, or Firm*—Tanaki K. Davda; Konrad Raynes & Victor LLP

(57) ABSTRACT

Disclosed is a technique for applying changes back to an original copy of data to reduce an amount of data transferred. A first indicator is maintained for each block of data in a first storage to indicate whether the block of data has been updated in the first storage since the block of data was last transferred to a second storage. A second indicator is maintained for each block of data in the second storage to indicate whether the block of data has been updated in the second storage since the block of data in the second storage was overwritten by a corresponding block of data in the first storage. Upon receiving a reverse restore operation, each block of data in the second storage for which a second indicator has been set to indicate that the block of data has been updated is transferred to the first storage and each block of data in the second storage that corresponds to a block of data in the first storage for which a first indicator has been set to indicate that the block of data in the first storage has been updated is transferred to the first storage.

27 Claims, 8 Drawing Sheets

U.S. PATENT DOCUMENTS

| | | | | |
|---|---|---|---|---|
| 5,500,806 | A | * | 3/1996 | Bellin et al. ................. 700/298 |
| 5,668,991 | A | * | 9/1997 | Dunn et al. ................. 707/202 |
| 5,724,581 | A | * | 3/1998 | Kozakura ................... 707/202 |
| 5,974,429 | A | * | 10/1999 | Strub et al. ................. 707/203 |
| 6,047,294 | A | * | 4/2000 | Deshayes et al. ........... 707/204 |
| 6,490,598 | B1 | * | 12/2002 | Taylor ........................ 707/204 |
| 6,611,901 | B1 | * | 8/2003 | Micka et al. ................ 711/162 |
| 6,662,198 | B1 | * | 12/2003 | Satyanarayanan et al. .. 707/204 |
| 6,691,245 | B1 | * | 2/2004 | DeKoning ..................... 714/6 |
| 6,732,125 | B1 | * | 5/2004 | Autrey et al. ................ 707/204 |
| 6,738,757 | B1 | * | 5/2004 | Wynne et al. ................. 707/3 |
| 6,799,189 | B1 | * | 9/2004 | Huxoll ........................ 707/204 |
| 6,839,819 | B1 | * | 1/2005 | Martin ........................ 711/162 |
| 2003/0131253 | A1 | * | 7/2003 | Martin et al. ................ 713/200 |
| 2004/0107226 | A1 | * | 6/2004 | Autrey et al. ................ 707/204 |
| 2004/0260897 | A1 | * | 12/2004 | Sanchez et al. ............. 711/162 |
| 2004/0260898 | A1 | * | 12/2004 | Stanley et al. .............. 711/162 |

OTHER PUBLICATIONS

EMC Corporation, "EMC TimeFinder: Create Mirror Images of Active Production Data." [online] © EMC Corporation, [Retrieved on May 13, 2003], retrieved from the Internet at <URL: http://www.emc.com/products/software/timefinder.jsp>.

EMC Corporation, "EMC TimeFinder: Data Sheet", [online], © 2003 EMC Corporation, [Retrieved on May 13, 2003], retrieved from the Internet at <URL: http://www.emc.com/products/product_pdfs/ds/timefinder_1700-4.pdf>.

EMC Corporation, "EMC TimeFinder Product Description Guide", [online], © 1998 EMC Corporation, pp. 1-32, [Retrieved on May 13, 2003], retrieved from the Internet at <URL: http://www.emc.com/products/product_pdfs/pdg/timefinder_pdg.pdf>.

Hitachi Data Systems Corporation, "CARE—the Copy suite", [online] © 1999 Hitachi Data Systems Corporation, [Retrieved on May 13, 2003], retrieved from the Internet at <URL: http://www.hds.com/pdf/shadowim_flyer.pdf>.

Hitachi Data Systems Corporation, "NanoCopy", [online] © 2001 Hitachi Data Systems Corporation, [Retrieved on May 13, 2003], retrieved from the Internet at <URL: http://www.hds.com/pdf/hitachinano.pdf>.

Storage Technology Corporation, "StorageTek SnapShot", [online] © 2001 Storage Technology Corporation, [Retrieved on May 13, 2003], retrieved from the Internet at <URL: http://www.storagetek.com/prodserv/pdfs/SnapShot.ms2010be-pBR06_01.pdf>.

* cited by examiner

METHOD, SYSTEM, AND PROGRAM FOR REVERSE RESTORE OF AN INCREMENTAL VIRTUAL COPY

CROSS-REFERENCE TO RELATED APPLICATIONS

This application is related to the following commonly assigned and co-pending U. S. patent applications:

U.S. Patent Application Publication No. 2004/0260898, published on Dec. 23, 2004, with application Ser. No. 10/465,118 entitled "METHOD, SYSTEM, AND PROGRAM FOR INCREMENTAL VIRTUAL COPY," by S. Werner, et at.; and U.S. Patent Application Publication No. 2004/0260897, publisbed on Dec. 23, 2004, with application Ser. No. 10/465,069 entitled "METHOD, SYSTEM, AND PROGRAM FOR RECOVERY OF A REVERSE RESTORE OPERATION," by M. Sanchez, et al.;

each of which is filed on the same date herewith, and which is incorporated by reference herein in its entirety.

BACKGROUND OF THE INVENTION

1. Field of the Invention

The present invention is directed to reverse restore of an incremental virtual copy.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives connected in a loop architecture, otherwise referred to as a Direct Access Storage Device (DASD). Hosts may communicate Input/Output (I/O) requests to the storage space through the storage controller.

In many systems, data on one storage device, such as a DASD, may be copied to the same or another storage device so that access to data volumes can be provided from two different devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

A number of direct access storage device (DASD) subsystems are capable of performing "instant virtual copy" operations, also referred to as "fast replicate functions." Instant virtual copy operations work by modifying metadata such as relationship tables or pointers to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

One such instant virtual copy operation is known as a FlashCopy® operation. A FlashCopy® operation involves establishing a logical point-in-time relationship between source and target volumes on the same or different devices. The FlashCopy® operation guarantees that until a track in a FlashCopy® relationship has been hardened to its location on the target disk, the track resides on the source disk. A relationship table is used to maintain information on all existing FlashCopy® relationships in the subsystem. During the establish phase of a FlashCopy® relationship, one entry is recorded in the source and target relationship tables for the source and target that participate in the FlashCopy® being established. Each added entry maintains all the required information concerning the FlashCopy® relationship. Both entries for the relationship are removed from the relationship tables when all FlashCopy® tracks from the source extent have been physically copied to the target extents or when a withdraw command is received. In certain cases, even though all tracks have been copied from the source extent to the target extent, the relationship persists.

The target relationship table further includes a bitmap that identifies which tracks involved in the FlashCopy® relationship have not yet been copied over and are thus protected tracks. Each track in the target device is represented by one bit in the bitmap. The target bit is set when the corresponding track is established as a target track of a FlashCopy® relationship. The target bit is reset when the corresponding track has been copied from the source location and destaged to the target device due to writes on the source or the target device, or a background copy task.

In the prior art, as part of the establishment of the logical point-in-time relationship during the FlashCopy® operation, all tracks in the source cache that are included in the FlashCopy® relationship must be destaged to the physical source volume, e.g., source DASD, and all tracks in the target cache included in the FlashCopy® must be discarded. Further details of the FlashCopy® operations are described in the commonly assigned U.S. Pat. No. 6,611,901, issued on August 2003, with U.S. patent application Ser. No. 09/347,344, filed on Jul. 2, 1999, entitled "Method, System, and Program for Maintaining Electronic Data as of a Point-in-Time", which patent application is incorporated herein by reference in its entirety.

Once the logical relationship is established, hosts may then have immediate access to data on the source and target volumes, and the data may be copied as part of a background operation. A read to a track that is a target in a FlashCopy® relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the FlashCopy® operation. Further, any destages to tracks on the source device that have not been copied over triggers a destage intercept, which causes the tracks on the source device to be copied to the target device.

Instant virtual copy techniques have been developed, at least in part, to quickly create a duplicate copy of data without interrupting or slowing foreground processes.

Instant virtual copy techniques, such as a FlashCopy® operation, provide a point-in-time copy tool. Instant virtual copy techniques may be used for a variety of applications, including, for example, data backup, data migration, data mining, testing, etc. For example, an instant virtual copy technique may be used for the creation of a physical "backup" copy of the source data, to aid in disaster recovery.

Although the instant virtual copy techniques are useful for copying large amounts of data, conventional instant virtual copy techniques may be improved.

SUMMARY OF THE INVENTION

Provided are a method, system, and program for applying changes back to an original copy of data to reduce an amount of data transferred. A first indicator is maintained for each block of data in a first storage to indicate whether the block of data has been updated in the first storage since the block of data was last transferred to a second storage. A second indicator is maintained for each block of data in the second storage to indicate whether the block of data has been updated in the second storage since the block of data in the second storage was overwritten by a corresponding block of data in the first storage. Upon receiving a reverse restore operation, each block of data in the second storage for which a second indicator has been set to indicate that the block of data has been updated is transferred to the first storage and each block of data in the second storage that corresponds to a block of data in the first storage for which a first indicator has been set to indicate that the block of data in the first storage has been updated is transferred to the first storage.

The described implementations of the invention provide a method, system, and program that allows updates to be made to a target volume of a target instant virtual copy and then allows those changes to be applied back to a corresponding source volume, making the source and target volumes identical. Moreover, the described implementations of the invention provide a method, system, and program to allow updates to be made to a source volume of a source instant virtual copy, and then allows those changes to be undone, making the source and target volumes identical.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention provide a reverse restore operation that is an enhancement to an instant virtual copy operation. With the reverse restore operation, updates may be made to a source or target volume of an instant virtual copy. Then, the changes from the original target volume may be applied back to a corresponding original source volume, making the original source volume (i.e., new target volume) a point-in-time copy of the original target volume (i.e., new source volume).

Figure 1A:
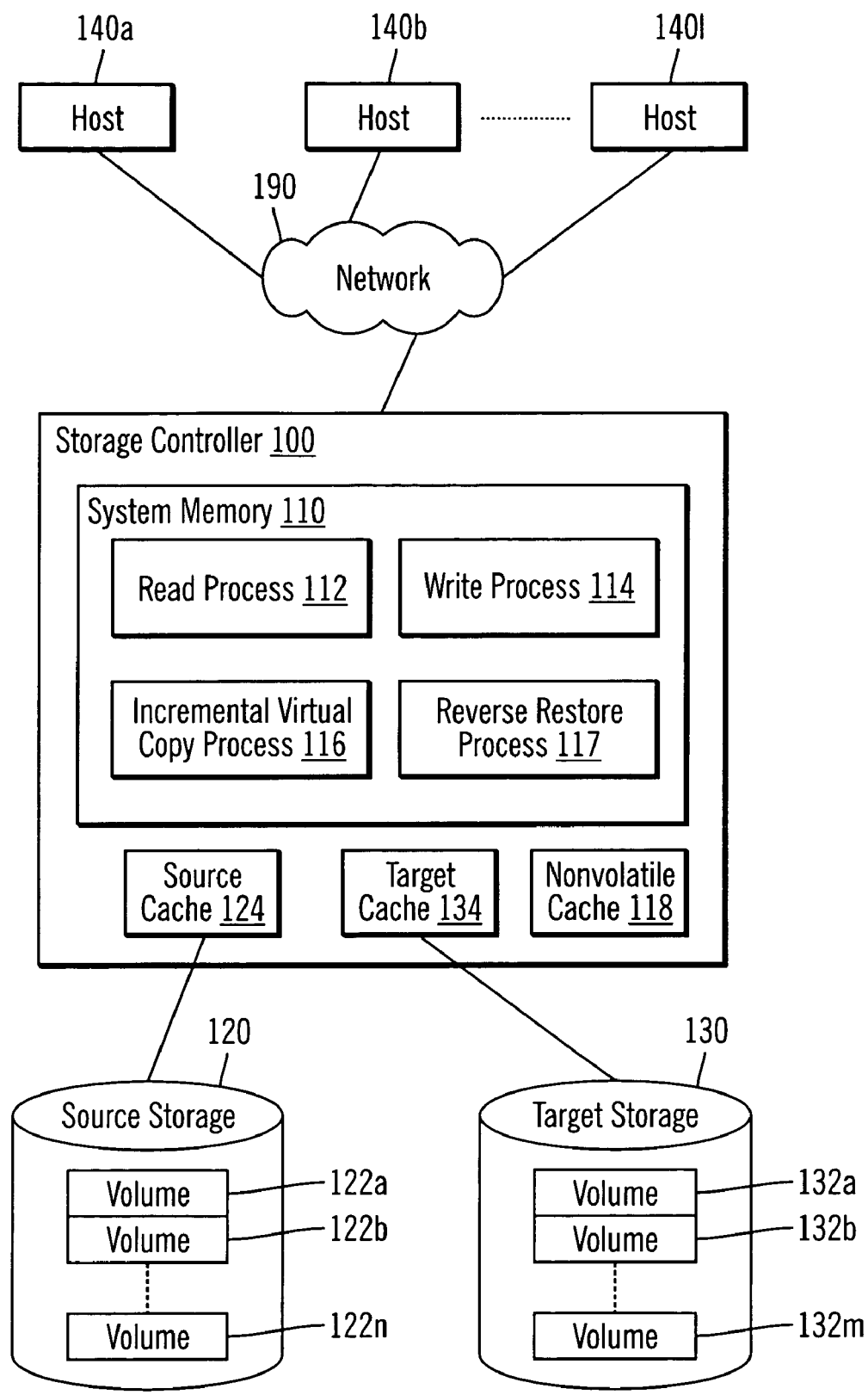
FIGS. 1A and 1B illustrate, in block diagrams, a computing environment in accordance with certain implementations of the invention.
Figure 1B:
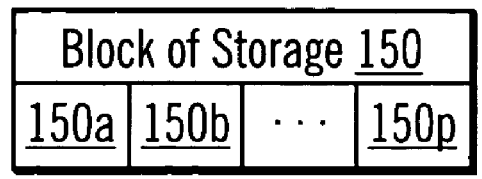

FIGS. 1A and 1B illustrate, in block diagrams, a computing environment in accordance with certain implementations of the invention. A storage controller 100 receives Input/Output (I/O) requests from hosts 140a,b, . . . l (wherein a,b, and l may be any integer value) over a network 190 directed toward storage devices 120, 130 configured to have volumes (e.g., Logical Unit Numbers, Logical Devices, etc.) 122a,b . . . n and 132a,b . . . m, respectively, where m and n may be different integer values or the same integer value. In certain implementations, the size of the target storage 130 may be larger than or equal to the source storage 120.

The source storage 120 includes one or more volumes 122a,b . . . n, which may be divided into blocks of storage 150 containing blocks of data, and the blocks of storage 150 are further divided into sub-blocks of storage (150a–150p, where a and p may be any integer value) that contain sub-blocks of data. A volume may be any logical or physical element of storage. In certain implementations, the blocks of data are contents of tracks, while the sub-blocks of data are contents of sectors of tracks.

Target storage 130 maintains copies of all or a subset of the volumes 122a,b . . . n of the source storage 120. Additionally, target storage 130 may be modified by, for example, host 140. Target storage 130 includes one or more volumes 132a,b . . . m, which may be divided into blocks of storage 150 containing blocks of data, and the blocks of storage 150 are further divided into sub-blocks of storage (150a–150p, where a and p may be any integer value) that contain sub-blocks of data. A volume may be any logical or physical element of storage. In certain implementations, the blocks of data are tracks, while the sub-blocks of data are sectors of tracks.

For ease of reference, the terms tracks and sectors will be used herein as examples of blocks of data and sub-blocks of data, but use of these terms is not meant to limit implementations of the invention to tracks and sectors. The implementations of the invention are applicable to any type of storage, block of storage or block of data divided in any manner. Moreover, although implementations of the invention refer to blocks of data, alternate implementations of the invention are applicable to sub-blocks of data.

The storage controller 100 includes a source cache 124 in which updates to tracks in the source storage 120 are maintained until written to source storage 120 (i.e., the tracks are destaged to physical storage). The storage controller 100 includes a target cache 134 in which updates to tracks in the target storage 130 are maintained until written to target storage 130 (i.e., the tracks are destaged to physical storage). The source cache 124 and target cache 134 may comprise separate memory devices or different sections of a same memory device. The source cache 124 and target cache 134 are used to buffer read and write data being transmitted between the hosts 140a,b . . . l, source storage 120, and target storage 130. Further, although caches 124 and 134 are referred to as source and target caches, respectively, for holding source or target blocks of data in a point-in-time copy relationship, the caches 124 and 134 may store at the same time source and target blocks of data in different point-in-copy relationships.

Additionally, the storage controller 100 includes a non-volatile cache 118. The non-volatile cache 118 may be, for example, a battery-backed up volatile memory, to maintain a non-volatile copy of data updates.

The storage controller 100 further includes system memory 110, which may be implemented in volatile and/or non-volatile devices. The system memory 110 includes a read process 112 for reading data, a write process 114 for writing data, an incremental virtual copy process 116, and a reverse restore process 117. The read process 112 executes in system memory 110 to read data from storages 120 and 130 to caches 124 and 134, respectively. The write process 114 executes in system memory 110 to write data from caches 124 and 134 to storages 120 and 130, respectively. The incremental virtual copy process 116 executes in system memory 110 to perform an incremental virtual copy operation that transfers data from source storage 120 to target storage 130. The incremental virtual copy process is described further in the cross-referenced patent application, U.S. Patent Application Publication No. 2004/0260898. published on Dec. 23, 2004, "METHOD, SYSTEM, AND PROGRAM FOR INCREMENTAL VIRTUAL COPY," by S. Weiner, et al., which is incorporated herein in its entirety. The reverse restore process 117 executes in system memory 110 to perform a reverse restore operation that reverses the roles of the original source and original target and transfers data from the original target storage 130 to the original source storage 120. In certain implementations of the invention, there may be multiple reverse restore processes. In certain implementations of the invention, the reverse restore process may be executed at another storage controller connected to storage controller 100 instead of, or in addition to, execution at the storage controller 100. The system memory 110 may be in a separate memory devices from caches 124 and 134 or may share a memory device with one or both caches 124 and 134.

Implementations of the invention are applicable to the transfer of data between any two storage mediums, which for ease of reference will be referred to herein as source storage and target storage or as first storage and second storage. For example, certain implementations of the invention may be used with two storage mediums located at a single storage controller, as illustrated in FIG. 1A. Moreover, certain alternative implementations of the invention may be used with two storage mediums located at different storage controllers, different physical sites, etc. Also, for ease of reference, a block of data in source storage will be referred to as a "source block of data," and a block of data in target storage will be referred to as a "target block of data." When the indication of which storage is source storage and which storage is target storage is reversed, for ease of reference, the original "source block of data" will be referred to as the "new target block of data," and the original "target block of data" will be referred to as the "new source block of data."

In certain implementations, removable storage (instead of or in addition to target storage 130) may be used to maintain copies of all or a subset of the source storage 120, and the implementations of the invention transfer data to the removable storage rather than to the target storage. The removable storage may reside at the storage controller 100.

The storage controller 100 may further include a processor complex (not shown) and may comprise any storage controller or server known in the art, such as an Enterprise Storage Server® (ESS), 3990® Storage Controller, etc. The hosts 140a,b . . . l may comprise any computing device known in the art, such as a server, mainframe, workstation, personal computer, hand held computer, laptop telephony device, network appliance, etc. The storage controller 100 and host system(s) 140a,b . . . l communicate via a network 190, which may comprise a Storage Area Network (SAN), a Source Area Network (LAN), Wide Area Network (WAN), the Internet, an Intranet, etc. The source storage 120 and target storage 130 may each comprise an array of storage devices, such as Direct Access Storage Devices (DASDs), Just a Bunch of Disks (JBOD), Redundant Array of Independent Disks (RAID), virtualization device, etc.

Additionally, although FIG. 1A illustrates a single storage controller, one skilled in the art would know that multiple storage controllers may be connected via a network (e.g., a Source Area Network (LAN), Wide Area Network (WAN), the Internet, etc.), and one or more of the multiple storage controllers may implement the invention.

When host 140 wishes to update a block of data in source storage 120, host 140 writes data to a block of storage in source cache 124. Write operations modify the block of storage in source cache 124 synchronously (i.e., writing host 140 waits for the operation to complete), and then, in a background process, source cache 124 content is written to source storage 120. A write operation may update data, write new data, or write the same data again. Writing data in source cache 124 to source storage 120 is called a destage operation. Copying all or a portion of a block of data from source storage 120 to source cache 124 is a staging operation. Likewise, data may be staged and destaged between target storage 130 and target cache 134. Moreover, data may be staged from source storage 120 to target cache 134.

Figure 2:
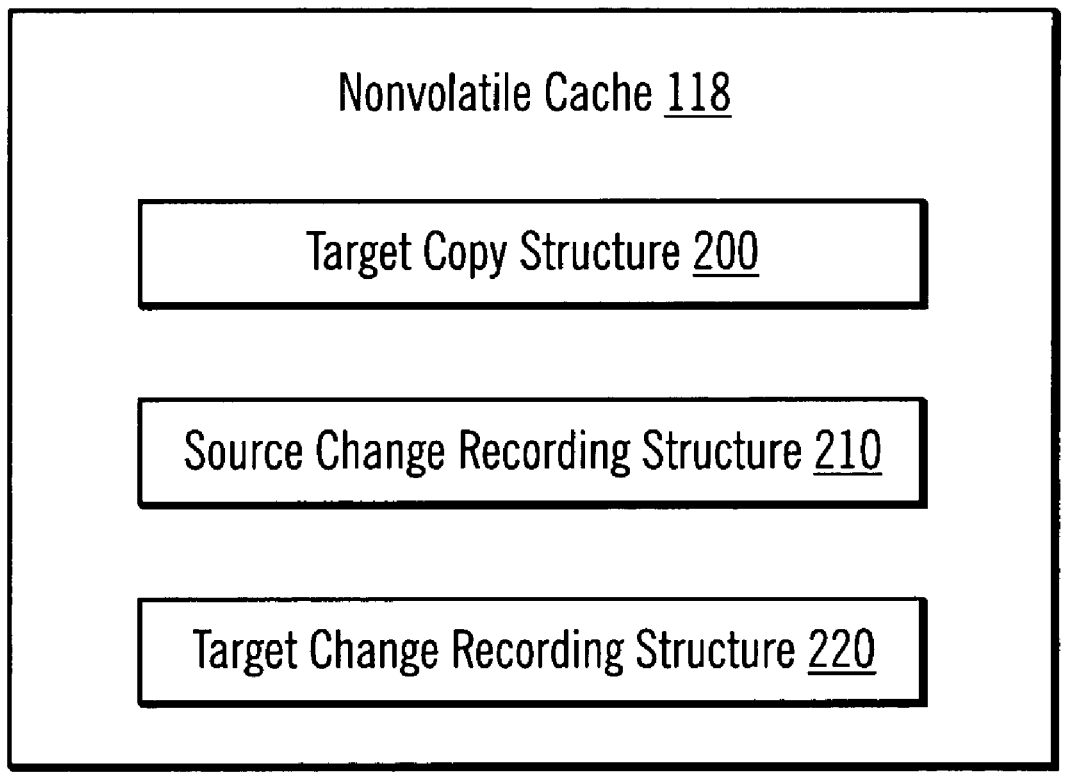
FIG. 2 illustrates various structures in accordance with certain implementations of the invention.

FIG. 2 illustrates various structures 200, 210, and 220 in accordance with certain implementations of the invention. Nonvolatile cache 118 includes a target copy structure 200. The target copy structure 200 may be used to determine whether to retrieve data from source storage 120 or target storage 130 to cache 124 or 134, respectively (i.e., for a staging operation). Additionally, the target copy structure 200 may be used to determine which blocks of data in source storage 120 are to be copied to target storage 130. The target copy structure 200 includes an indicator (e.g., a bit) for each block of data in, for example, a volume. When an indicator is set to a first value (e.g., one), the setting indicates that the block of data is to be retrieved from the source storage 120 for a staging operation or indicates that the block of data is to be copied to target storage 130 for a copy operation (e.g., a background physical copy operation). When an indicator is set to a second value (e.g., zero), the setting indicates that the block of data is to be retrieved from the target storage 130 for a staging operation or indicates that the block of data is not to be copied from source storage 120 to target storage 130 for a copy operation (e.g., a background physical copy operation).

A source change recording structure 210 is used to monitor updates to blocks of data within portions of data in the source storage 120 for which an incremental virtual copy relationship has been established. The source change recording structure 210 includes an indicator (e.g., a bit) for each block of data in the source storage 120 that is part of the incremental virtual copy relationship. When an indicator is set to a first value (e.g., one), the setting indicates that the block of data has been updated since the last copy operation (e.g., an incremental virtual copy operation or a reverse restore operation). When an indicator is set to a second value (e.g., zero), the setting indicates that the block of data has not been updated since the last copy operation (e.g., an incremental virtual copy operation or a reverse restore operation).

A target change recording structure 220 is used to monitor updates to blocks of data in the target storage 130 after an incremental virtual copy relationship has been established. The target change recording structure 220 includes an indicator (e.g., a bit) for each block of data in the target storage 130 that is part of the incremental virtual copy relationship. When an indicator is set to a first value (e.g., one), the setting indicates that the block of data has been updated since the last copy operation. When an indicator is set to a second value (e.g., zero), the setting indicates that the block of data has not been updated since the last copy operation.

In certain implementations of the invention, each structure 200, 210, and 220 comprises a bitmap, and each indicator comprises a bit. In each structure 200, 210, and 220, the nth indicator corresponds to the nth block of data (e.g., the first indicator in each structure 200, 210, and 220 corresponds to the first data block). Although the structures 200, 210, and 220 have been illustrated as three separate structures, the structures may be combined in any form without departing from the scope of the invention. In certain implementations of the invention, there is a copy of each structure for each volume. In certain alternative implementations of the invention, there is a single copy of each structure for all volumes. Moreover, although structures 210 and 220 are referred to as source and target, respectively, in the illustration, the designation of source and target may be changed when the storage 120 is to be treated as a target, while storage 130 is to be treated as a source.

Figure 3:
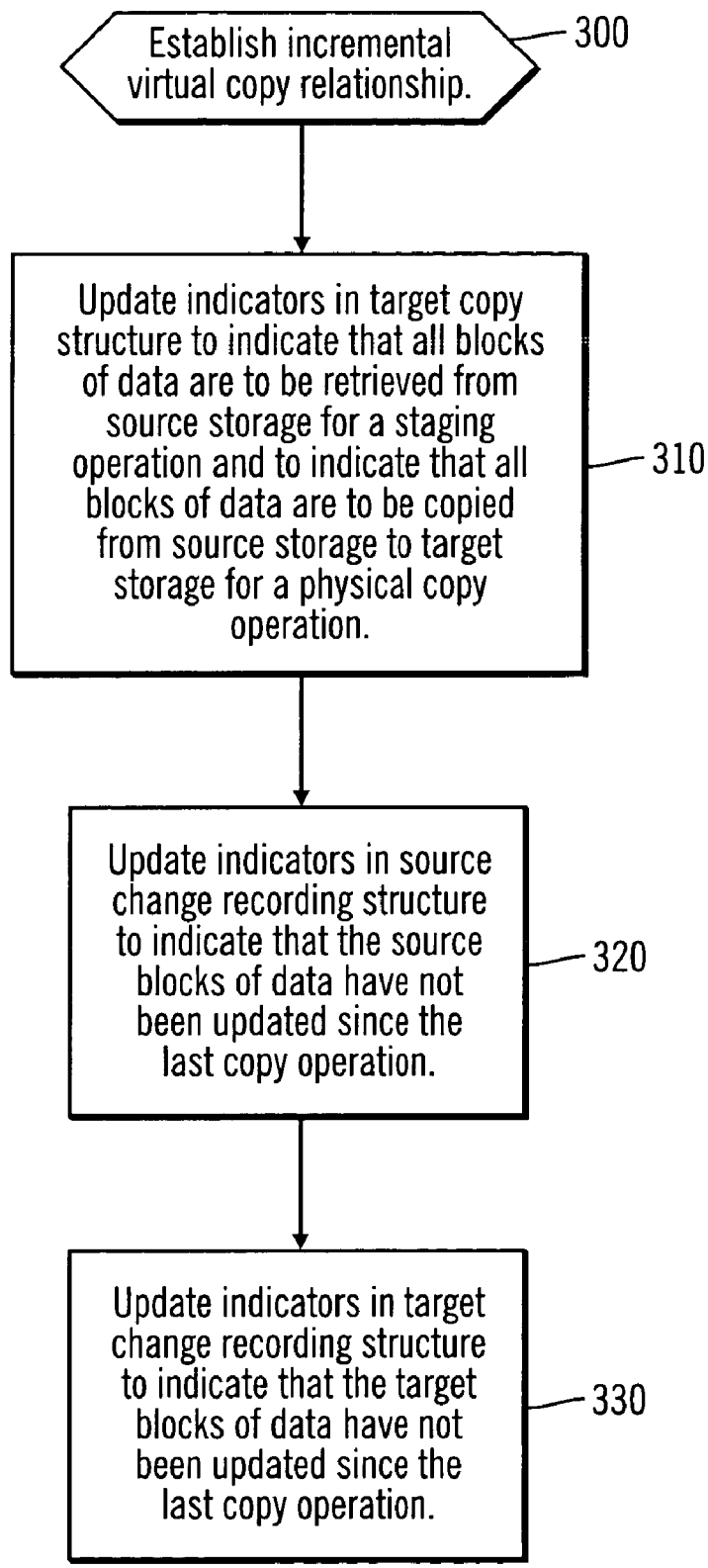
FIG. 3 illustrates logic for updating structures in accordance with certain implementations of the invention.

FIG. 3 illustrates logic implemented in the incremental virtual copy process 116 for updating structures in accordance with certain implementations of the invention. Control begins at block 300 with initial establishment of an incremental virtual copy relationship. The incremental virtual copy relationship is formed between one or more portions of data (e.g., source volumes) in the source storage 120 and corresponding portions of data (e.g., target volumes) in the target storage 130 when an incremental virtual copy operation is performed between the corresponding portions of data. The first incremental virtual copy operation may copy, for example, one or more source volumes to corresponding target volumes. Subsequent copies, however, may make incremental copies, avoiding re-copying any portions of source volumes that have not changed since the last copy operation.

In block 310, the incremental virtual copy process 116 updates indicators in the target copy structure 200 to indicate that all of the blocks of data corresponding to the indicators are to be retrieved from source storage for a staging operation and to indicate that all blocks of data are to be copied from source storage to target storage for a physical copy operation. In certain implementations of the invention, the indicators in the target copy structure 200 are set to one.

In block 320, the incremental virtual copy process 116 updates the indicators in the source change recording structure 210 to indicate that the source blocks of data corresponding to the indicators have not been updated since the last copy operation (e.g., incremental virtual copy operation). In certain implementations of the invention, all of the indicators in the source change recording structure 210 are set to zero. In block 330, the incremental virtual copy process 116 updates the indicators in the target change recording structure 220 to indicate that the target blocks of data corresponding to the indicators have not been updated since the last copy operation (e.g., incremental virtual copy operation). In certain implementations of the invention, all of the indicators in the target change recording structure 220 are set to zero.

Figure 4:
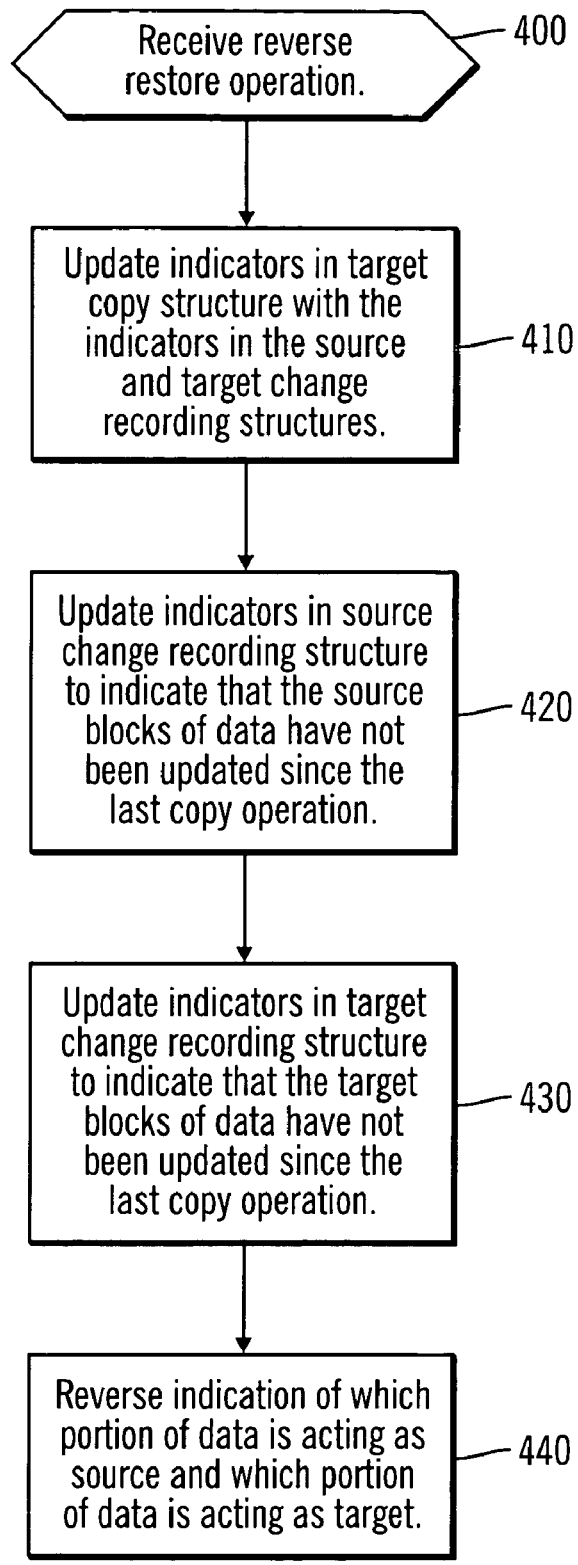
FIG. 4 illustrates logic implemented in the reverse restore process for performing an incremental virtual copy in accordance with certain implementations of the invention.

FIG. 4 illustrates logic implemented in the reverse restore process 117 for performing an incremental virtual copy in accordance with certain implementations of the invention. In certain implementations of the invention, prior to execution of the reverse restore process 117, a physical background copy has completed and the indicators in the target copy structure 200 are set (e.g., to zero) to indicate that the blocks of data corresponding to the indicators are not to be copied for a copy operation. Control begins at block 400 with the reverse restore process 117 receiving a reverse restore operation. A reverse restore operation may be issued by host 140. Although not shown in the flow of FIG. 4, prior to receipt of the reverse restore operation, one or more blocks of data may have been updated in the source storage 120 and/or the target storage 130, by, for example, a user at host 140.

In block 410, the reverse restore process 117 updates indicators in the target copy structure 200 with indicators in the source and target change recording structures 210 and 220. In certain implementations of the invention, the source change recording structure 210 is merged with the target change recording structure 220 using an "OR" operation, and the result of the "OR" operation is stored in the target copy structure 200.

In block 420, after the target copy structure 200 has been updated, the reverse restore process 117 updates indicators in the source change recording structure 210 to indicate that the source blocks of data have not been updated since the last copy operation (e.g., incremental virtual copy operation or reverse restore operation). In certain implementations of the invention, all of the indicators in the source change recording structure 210 are set to zero. In block 430, the reverse restore process 117 updates the indicators in the target change recording structure 220 to indicate that the target blocks of data have not been updated since the last copy operation (e.g., incremental virtual copy operation or reverse restore operation). In certain implementations of the invention, all of the indicators in the target change recording structure 220 are set to zero.

In block 440, the indication of which portion of data is acting as source and which portion of data is acting as target is reversed. That is, when portions (e.g., storage, volumes, tracks, sectors, etc.) of data in the source storage 120 are originally treated as source portions of data, and portions of data in the target storage 130 are originally treated as target portions of data, the reversal treats the portions of data in the target storage 130 as source portions of data and treats the portions of data in the source storage 120 as the target portions of data. Then, copying is performed from the new source to the new target (e.g., from storage 130 to storage 120). When the indication of which portions of data are to be treated as source and target is reversed, for ease of reference, the portions of data that are to be treated as source may be referred to as "new source" portions of data (e.g., new source storage or new source block of data), and the portions of data that are to be treated as target may be referred to as "new target" portions of data (e.g., new target storage or new target block of data).

Figure 5:
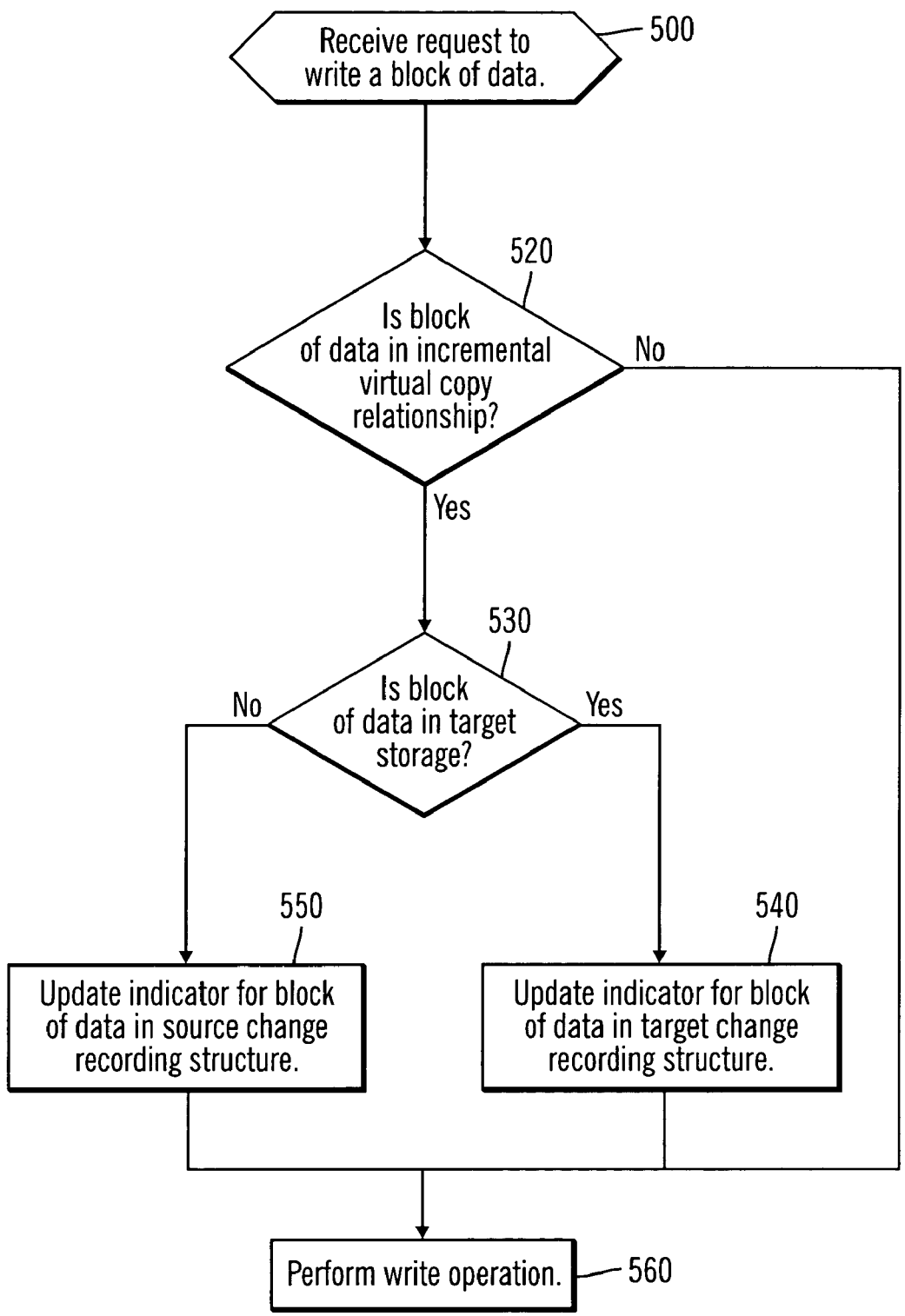
FIG. 5 illustrates logic implemented in write process for processing of a write operation in accordance with certain implementations of the invention.

FIG. 5 illustrates logic implemented in write process 114 for processing of a write operation in accordance with certain implementations of the invention. Control begins at block 500 with the write process 114 receiving a request to write a block of data. In block 520, the write process 114 determines whether the block of data is in an incremental virtual copy relationship. If so, processing continues to block 530, otherwise, processing continues to block 560. In block 530, the write process 114 determines whether the block of data is in target storage (which may be either storage 120 or 130, depending on the designation of source and target). If so, processing continues to block 540, otherwise, processing continues to block 550.

In block 540, the indicator for the block of data in the target change recording structure 220 is updated to indicate that the target block of data has changed since the last copy operation (e.g., incremental virtual copy operation). In certain implementations of the invention, the indicator in the target change recording structure 220 is set to one. In block 550, the indicator for the block of data in the source change recording structure 210 is updated to indicate that the source block of data has changed since the last copy operation. In certain implementations of the invention, the indicator in the source change recording structure 210 is set to one. In block 560, the write operation is performed by the write process 114.

Figure 6:
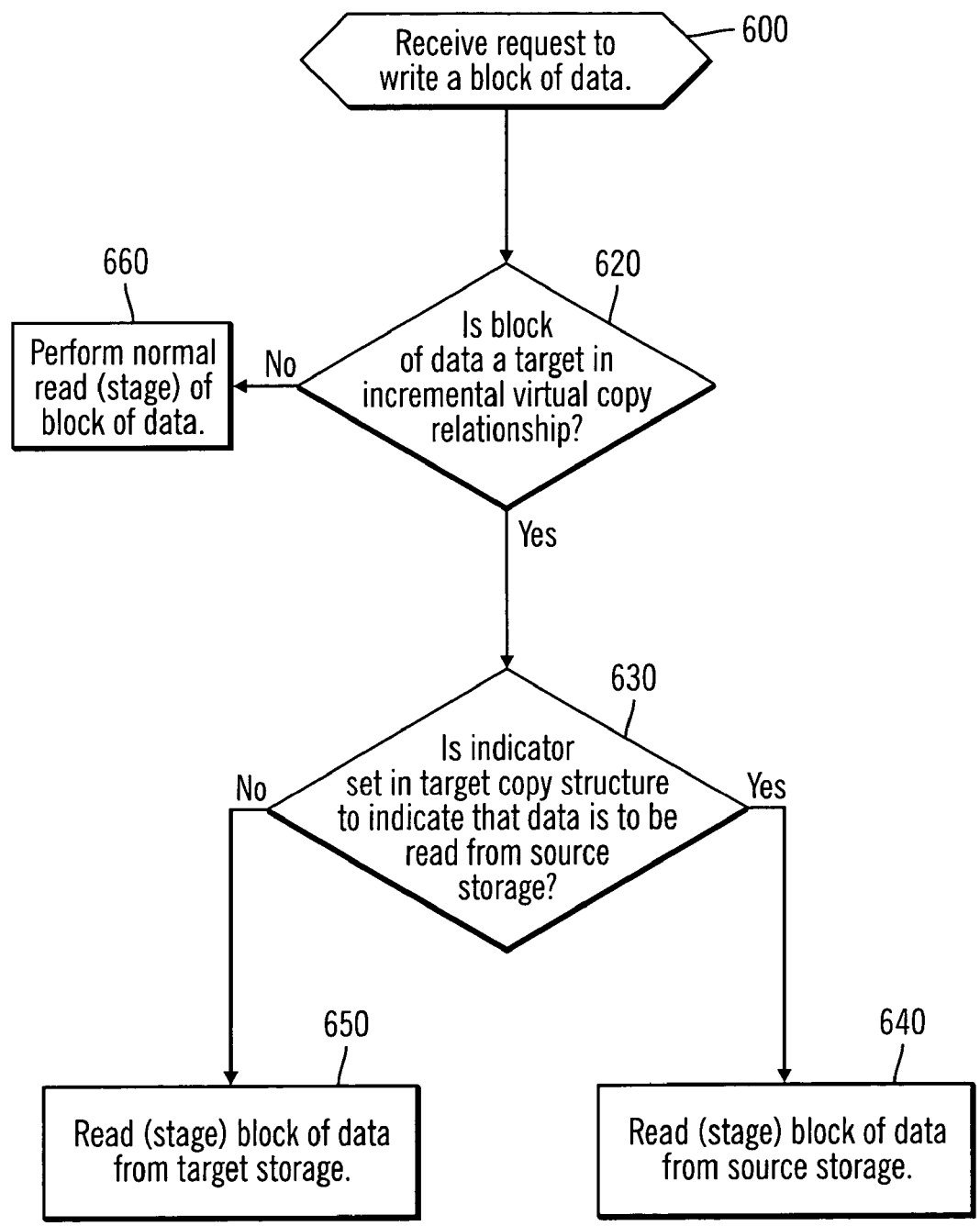
FIG. 6 illustrates logic implemented in the read process for processing of a read operation in accordance with certain implementations of the invention

FIG. 6 illustrates logic implemented in the read process 112 for processing of a read operation in accordance with certain implementations of the invention. Control begins at block 600 with receipt of a request to read a block of data. In block 620, the read process 112 determines whether the block of data is a target in an incremental virtual copy relationship. If so, processing continues to block 630, otherwise, processing continues to block 660. In block 630, the read process determines whether an indicator for the block of data is set in the target copy structure to indicate that data is to be read from source storage 120. If so, processing continues to block 640, otherwise, processing continues to block 650.

In block 640, the read process 112 reads (i.e., stages) the block of data from source storage 120. In block 650, the read process 112 reads (i.e., stages) the block of data from target storage 130. In block 660, the read process 112 performs a normal read of the block of data.

Figure 7:
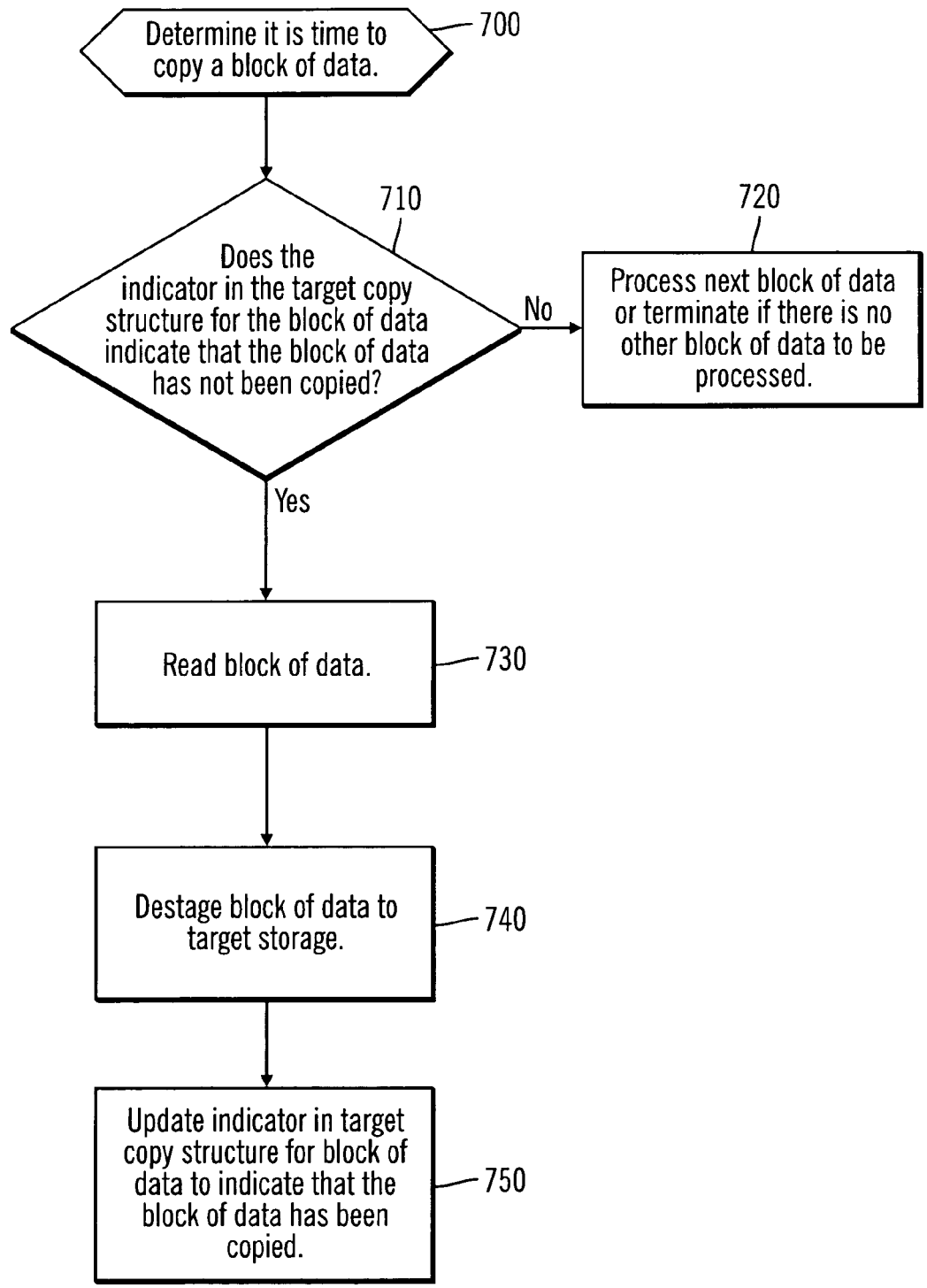
FIG. 7 illustrates a background copy process in accordance with certain implementations of the invention.

FIG. 7 illustrates a background copy process in accordance with certain implementations of the invention. Control begins at block 700 with a determination that it is time to copy a block of data. In block 710, it is determined whether the indicator in the target copy structure 200 for the block of data indicates that the block of data has not been copied. If so, processing continues to block 730, otherwise processing continues to block 720. In block 720, a next block of data may be processed or, if there are no other blocks of data to be processed, this logic terminates.

In block 730, the block of data is read in accordance with the logic of FIG. 6. In block 740, the block of data is destaged to target storage (which may be either storage 120 or 130, depending on the designation of source and target). In block 750, an indicator in the target copy structure 200 is updated for the block of data to indicate that the block of data has been copied. In certain implementations of the invention, the indicator in the target copy structure 200 is set to zero.

Thus, in certain implementations of the invention, the reverse restore operation is achieved by monitoring writes (i.e., updates) and recording changes to tracks for volumes participating in an incremental virtual copy relationship.

After an initial incremental virtual copy operation, the direction of the incremental virtual copy operation may be reversed and tracks that have been updated on either a source or a target volume may be copied from the original target volume to the original source volume, without copying the entire original target volume.

Enterprise Storage Server, FlashCopy, and 3990 are registered trademarks or common law marks of International Business Machines Corporation in the United States and/or other countries.

ADDITIONAL IMPLEMENTATION DETAILS

The described techniques for reverse restore of an incremental virtual copy may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The term "copy operation" herein may refer to various types of operations, including, for example: establishing an incremental virtual copy relationship, "incrementing" an incremental virtual copy operation, or "reverse restoring" an incremental virtual copy relationship.

The logic of FIGS. 3–7 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 3–7 may be implemented in software, hardware, programmable and non-programmable gate array logic or in some combination of hardware, software, or gate array logic.

Figure 8:
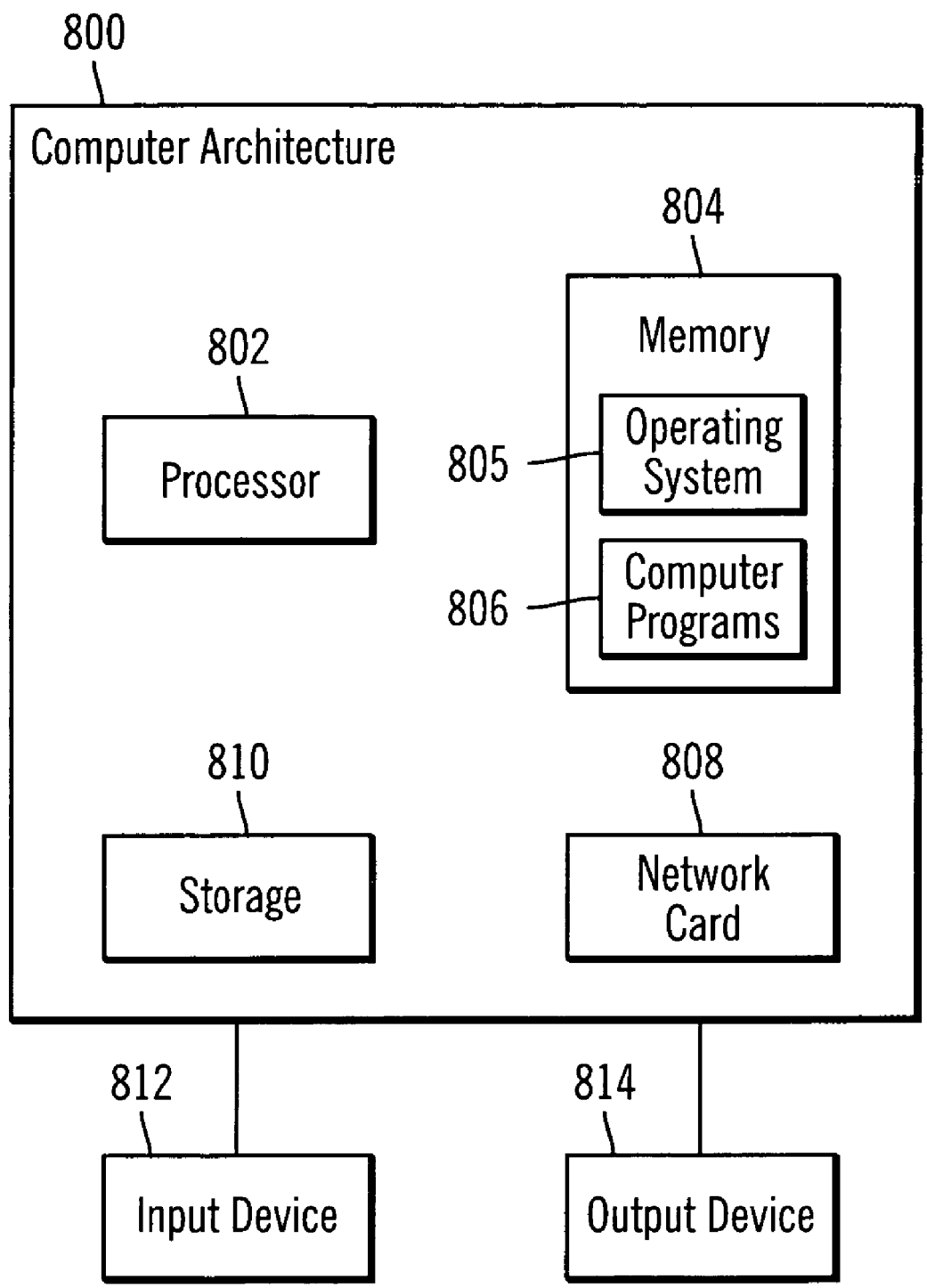
FIG. 8 illustrates an architecture of a computer system that may be used in accordance with certain implementations of the invention.

FIG. 8 illustrates an architecture of a computer system that may be used in accordance with certain implementations of the invention. A storage controller 100 and/or host 140 may implement computer architecture 800. The computer architecture 800 may implement a processor 802 (e.g., a microprocessor), a memory 804 (e.g., a volatile memory device), and storage 810 (e.g., a non-volatile storage area, such as magnetic disk drives, optical disk drives, a tape drive, etc.). An operating system 805 may execute in memory 804. The storage 810 may comprise an internal storage device or an attached or network accessible storage. Computer programs 806 in storage 810 may be loaded into the memory 804 and executed by the processor 802 in a manner known in the art. The architecture further includes a network card 808 to enable communication with a network. An input device 812 is used to provide user input to the processor 802, and may include a keyboard, mouse, pen-stylus, microphone, touch sensitive display screen, or any other activation or input mechanism known in the art. An output device 814 is capable of rendering information transmitted from the processor 802, or other component, such as a display monitor, printer, storage, etc. The computer architecture 800 of the computer systems may include fewer components than illustrated, additional components not illustrated herein, or some combination of the components illustrated and additional components.

The computer architecture 800 may comprise any computing device known in the art, such as a mainframe, server, personal computer, workstation, laptop, handheld computer, telephony device, network appliance, virtualization device, storage controller, etc. Any processor 802 and operating system 805 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for applying changes back to an original copy of data to reduce an amount of data transferred, comprising:
    maintaining a first indicator for each block of data in a first storage to indicate whether the block of data has been updated in the first storage since the block of data was last transferred to a second storage;
    maintaining a second indicator for each block of data in the second storage to indicate whether the block of data has been updated in the second storage since the block of data in the second storage was overwritten by a corresponding block of data in the first storage;
    maintaining a third indicator for each block of data in the second storage to indicate whether a corresponding block of data in the first storage or a block of data in the second storage is to be retrieved for a stage operation; and
    upon receiving a reverse restore operation,
        transferring each block of data in the second storage for which a second indicator has been set to indicate that the block of data has been updated to the first storage; and
        transferring each block of data in the second storage that corresponds to a block of data in the first storage for which a first indicator has been set to indicate that the block of data in the first storage has been updated to the first storage.

2. The method of claim 1, further comprising:
    designating the first storage as source storage;
    designating the second storage as target storage; and
    after receiving the reverse restore operation;
        designating the first storage as target storage; and
        designating the second storage as source storage.

3. The method of claim 1, further comprising:
    after receiving the reverse restore operation, updating the third indicator for each block of data in the second storage based on the first indicator for the block of data in the first storage and the second indicator for the block of data in the second storage corresponding to the block of data in the first storage, wherein transferring data from the second storage to the first storage comprises transferring each block of data in the second storage for which a third indicator indicates that the block of data in the second storage is to be transferred to the first storage.

4. The method of claim 1, further comprising:
    creating an incremental virtual copy relationship between a first portion of data and a second portion of data by performing an incremental virtual copy operation between the first portion of data and the second portion of data, wherein the first indicator and the second indicator are maintained for each block of data in the first portion of data and each block of data in the second portion of data in the incremental virtual copy relationship.

5. The method of claim 1, further comprising:
    when a first block of data is updated, updating the first indicator for the first block of data to indicate that the first block of data has been updated.

6. The method of claim 1, further comprising:
    when a second block of data is updated, updating the second indicator for the second block of data to indicate that the second block of data has been updated.

7. The method of claim 1, further comprising:
    treating the third indicator for each target block of data as an indicator for each new target block of data; and
    when a new source block of data has been copied to the new target storage, updating the third indicator for the new target block of data.

8. The method of claim 1, further comprising:
    treating the third indicator for each target block of data as an indicator for each new target block of data; and
    updating the third indicator for each new target block of data corresponding to at least one of the first indicator and the second indicator, wherein transferring data from the new source storage to the new target storage comprises transferring each new source block of data for which a third indicator indicates that the new source block of data is to be transferred to the new target storage.

9. A method for copying data, comprising:
    maintaining a first indicator for each source block of data to indicate whether the source block of data has been updated in source storage since the source block of data was last transferred to target storage;
    maintaining a second indicator for each target block of data in target storage to indicate whether the target block of data has been updated in target storage since the target block of data was overwritten by a corresponding source block of data;

maintaining a third indicator for each target block of data to indicate whether the source block of data or a corresponding target block of data is to be retrieved for a stage operation;

reversing an indication of which storage is to be treated as source storage and which storage is to be treated as target storage, wherein the source storage comprises new target storage and the target storage comprises new source storage, and wherein each source block of data is treated as a new target block of data and each target block of data is treated as a new source block of data;

transferring to the new target storage each new source block of data for which a second indicator has been set to indicate that the new source block of data has been updated; and transferring to the new target storage each new source block of data that corresponds to a new target block of data for which a first indicator has been set to indicate that the new target block of data has been updated.

10. An article of manufacture for applying changes back to an original copy of data to reduce an amount of data transferred, wherein the article of manufacture causes operations, the operations comprising:

maintaining a first indicator for each block of data in a first storage to indicate whether the block of data has been updated in the first storage since the block of data was last transferred to a second storage;

maintaining a second indicator for each block of data in the second storage to indicate whether the block of data has been updated in the second storage since the block of data in the second storage was overwritten by a corresponding block of data in the first storage;

maintaining a third indicator for each block of data in the second storage to indicate whether a corresponding block of data in the first storage or a block of data in the second storage is to be retrieved for a stage operation; and upon receiving a reverse restore operation, transferring each block of data in the second storage for which a second indicator has been set to indicate that the block of data has been updated to the first storage; and transferring each block of data in the second storage that corresponds to a block of data in the first storage for which a first indicator has been set to indicate that the block of data in the first storage has been updated to the first storage.

11. The article of manufacture of claim 10, the operations further comprising:

designating the first storage as source storage;

designating the second storage as target storage; and after receiving the reverse restore operation, designating the first storage as target storage; and designating the second storage as source storage.

12. The article of manufacture of claim 10, the operations further comprising:

after receiving the reverse restore operation, updating the third indicator for each block of data in the second storage based on the first indicator for the block of data in the first storage and the second indicator for the block of data in the second storage corresponding to the block of data in the first storage, wherein transferring data from the second storage to the first storage comprises transferring each block of data in the second storage for which a third indicator indicates that the block of data in the second storage is to be transferred to the first storage.

13. The article of manufacture of claim 10, the operations further comprising:

creating an incremental virtual copy relationship between a first portion of data and a second portion of data by performing an incremental virtual copy operation between the first portion of data and the second portion of data, wherein the first indicator and the second indicator are maintained for each block of data in the first portion of data and each block of data in the second portion of data in the incremental virtual copy relationship.

14. The article of manufacture of claim 10, the operations further comprising:

when a first block of data is updated, updating the first indicator for the first block of data to indicate that the first block of data has been updated.

15. The article of manufacture of claim 10, the operations further comprising:

when a second block of data is updated, updating the second indicator for the second block of data to indicate that the second block of data has been updated.

16. An article of manufacture for copying data, wherein the article of manufacture causes operations, the operations comprising:

maintaining a first indicator for each source block of data to indicate whether the source block of data has been updated in source storage since the source block of data was last transferred to target storage;

maintaining a second indicator for each target block of data in target storage to indicate whether the target block of data has been updated in target storage since the target block of data was overwritten by a corresponding source block of data;

maintaining a third indicator for each target block of data to indicate whether the source block of data or a corresponding target block of data is to be retrieved for a stage operation;

reversing an indication of which storage is to be treated as source storage and which storage is to be treated as target storage, wherein the source storage comprises new target storage and the target storage comprises new source storage, and wherein each source block of data is treated as a new target block of data and each target block of data is treated as a new source block of data;

transferring to the new target storage each new source block of data for which a second indicator has been set to indicate that the new source block of data has been updated; and transferring to the new target storage each new source block of data that corresponds to a new target block of data for which a first indicator has been set to indicate that the new target block of data has been updated.

17. The article of manufacture of claim 16, the operations further comprising:

treating the third indicator for each target block of data as an indicator for each new target block of data; and when a new source block of data has been copied to the new target storage, updating the third indicator for the new target block of data.

18. The article of manufacture of claim 16, the operations further comprising:

treating the third indicator for each target block of data as an indicator for each new target block of data; and updating the third indicator for each new target block of data corresponding to at least one of the first indicator and the second indicator, wherein transferring data from the new source storage to the new target storage comprises transferring each new source block of data for which a third indicator indicates that the new source block of data is to be transferred to the new target storage.

19. A system for applying changes back to an original copy of data to reduce an amount of data transferred, comprising:
   means for maintaining a first indicator for each block of data in a first storage to indicate whether the block of data has been updated in the first storage since the block of data was last transferred to a second storage;
   means for maintaining a second indicator for each block of data in the second storage to indicate whether the block of data has been updated in the second storage since the block of data in the second storage was overwritten by a corresponding block of data in the first storage;
   means for maintaining a third indicator for each block of data in the second storage to indicate whether a corresponding block of data in the first storage or a block of data in the second storage is to be retrieved for a stage operation; and
   upon receiving a reverse restore operation,
      means for transferring each block of data in the second storage for which a second indicator has been set to indicate that the block of data has been updated to the first storage; and
      means for transferring each block of data in the second storage that corresponds to a block of data in the first storage for which a first indicator has been set to indicate that the block of data in the first storage has been updated to the first storage.

20. The system of claim 19, further comprising:
   means for designating the first storage as source storage;
   means for designating the second storage as target storage; and
   after receiving the reverse restore operation,
      means for designating the first storage as target storage; and
      means for designating the second storage as source storage.

21. The system of claim 19, further comprising:
   means for, after receiving the reverse restore operation, updating the third indicator for each block of data in the second storage based on the first indicator for the block of data in the first storage and the second indicator for the block of data in the second storage corresponding to the block of data in the first storage, wherein transferring data from the second storage to the first storage comprises transferring each block of data in the second storage for which a third indicator indicates that the block of data in the second storage is to be transferred to the first storage.

22. The system of claim 19, further comprising:
   means for creating an incremental virtual copy relationship between a first portion of data and a second portion of data by performing an incremental virtual copy operation between the first portion of data and the second portion of data, wherein the first indicator and the second indicator are maintained for each block of data in the first portion of data and each block of data in the second portion of data in the incremental virtual copy relationship.

23. The system of claim 19, further comprising:
   when a first block of data is updated, means for updating the first indicator for the first block of data to indicate that the first block of data has been updated.

24. The system of claim 19, further comprising:
   when a second block of data is updated, means for updating the second indicator for the second block of data to indicate that the second block of data has been updated.

25. A system for reducing an amount of data transferred and copying data, comprising:
   means for maintaining a first indicator for each source block of data to indicate whether the source block of data has been updated in source storage since the source block of data was last transferred to target storage;
   means for maintaining a second indicator for each target block of data in target storage to indicate whether the target block of data has been updated in target storage since the target block of data was overwritten by a corresponding source block of data;
   means for maintaining a third indicator for each target block of data to indicate whether the source block of data or a corresponding target block of data is to be retrieved for a stage operation;
   means for reversing an indication of which storage is to be treated as source storage and which storage is to be treated as target storage, wherein the source storage comprises new target storage and the target storage comprises new source storage, and wherein each source block of data is treated as a new target block of data and each target block of data is treated as a new source block of data;
   means for transferring to the new target storage each new source block of data for which a second indicator has been set to indicate that the new source block of data has been updated; and
   means for transferring to the new target storage each new source block of data that corresponds to a new target block of data for which a first indicator has been set to indicate that the new target block of data has been updated.

26. The system of claim 25, further comprising:
   means for treating the third indicator for each target block of data as an indicator for each new target block of data; and
   when a new source block of data has been copied to the new target storage, means for updating the third indicator for the new target block of data.

27. The system of claim 25, further comprising:
   means for treating the third indicator for each target block of data as an indicator for each new target block of data; and
   means for updating the third indicator for each new target block of data corresponding to at least one of the first indicator and the second indicator, wherein transferring data from the new source storage to the new target storage comprises transferring each new source block of data for which a third indicator indicates that the new source block of data is to be transferred to the new target storage.

* * * * *